No. 12,046. Reissued Oct. 21, 1902.

F. W. ROBERTSHAW.

WATER HEATER CONTROLLING AND REVERSING VALVE.

(Application filed Aug. 28, 1902.)

Witnesses.
Fred D. Sweet.
Robert C. Totten

Inventor.
Frederick W. Robertshaw
By Kay & Totten
Attorneys.

UNITED STATES PATENT OFFICE.

FREDERICK W. ROBERTSHAW, OF PITTSBURG, PENNSYLVANIA.

WATER-HEATER CONTROLLING AND REVERSING VALVE.

SPECIFICATION forming part of Reissued Letters Patent No. 12,046, dated October 21, 1902.

Original No. 692,480, dated February 4, 1902. Application for reissue filed August 28, 1902. Serial No. 121,402.

*To all whom it may concern:*

Be it known that I, FREDERICK W. ROBERTSHAW, a resident of Pittsburg, in the county of Allegheny and State of Pennsylvania, have invented a new and useful Improvement in Water-Heater Controlling and Reversing Valves; and I do hereby declare the following to be a full, clear, and exact description thereof.

My invention relates to a controlling and reversing valve for water-heaters; and its object is to provide a valve of this description which will reverse the flow of water through the reservoir and heater when hot water is being drawn, whereby the hot water in the reservoir is made to pass through the heater pipe or coil, so that it is reheated therein, and the heater pipe or coil is cleaned of any sediment which has been deposited therein at each drawing of the hot water, thus preventing the accumulation of sediment in the heater-pipe and reservoir and keeping the heater-pipe clean, so that the heating efficiency thereof is maintained.

A further object of my invention is to provide a controlling and reversing valve for this purpose which is so constructed that the hot water will not be wasted by reason of a leaky faucet on the hot-water service-pipe and which will insure the entire closing of the circulation-port before the feed-port is opened.

Figure 1:
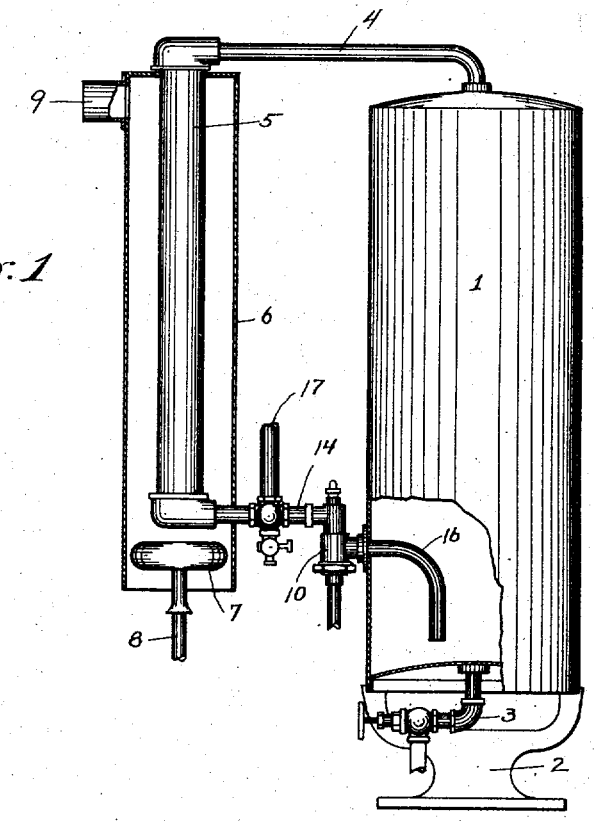
Figure 2:
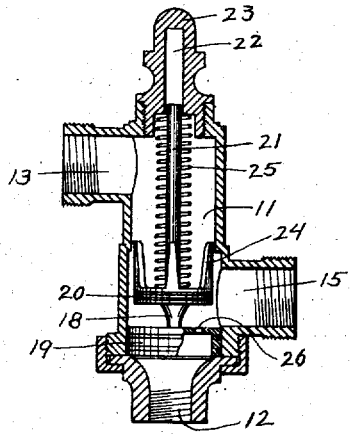
Figure 3:
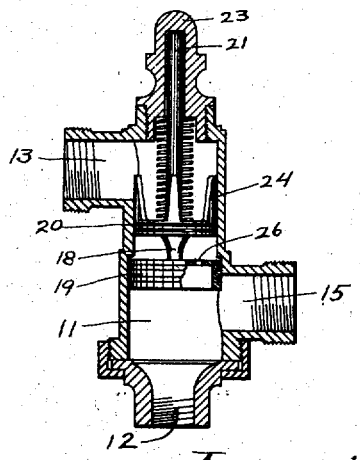

In the accompanying drawings, Figure 1 is a side view, partly in section, showing a reservoir and heater with my improved valve applied thereto. Fig. 2 is a vertical section through the valve, showing one position thereof; and Fig. 3 is a similar view showing the position of the valve when hot water is being drawn.

I have shown my invention used in connection with an ordinary water reservoir or boiler 1, supported upon a suitable stand or bracket 2 and provided at its lower end with the drain-pipe 3. The reservoir is connected at its top end by the pipe 4 with the upper end of the heater-pipe 5, which may be of any desired form, such as the straight pipe shown, or a coil, or of any known form. This pipe is shown as inclosed in the casing 6, in the lower end of which is the gas-burner 7, supplied through the pipe 8, and said casing is provided at its upper end with the draft-outlet 9. My invention, however, is not limited to the precise form of heater shown, as in lieu of the pipe and gas-heater shown any form of heater may be employed—such, for instance, as the ordinary coil located in the water-back of a range or a heater-pipe of any known form and heated in any known manner.

My improved valve is shown at 10, and the same comprises a suitable casing provided with a cylindrical chamber 11, in which the valve mechanism works, said casing having a feed-port 12 at its lower end, to which the cold-water pipe is connected, and being provided with two side ports at different heights, one of which, 13, is the main circulating-port and is connected to the lower end of the heater-pipe 5 by a pipe 14, while the other port, 15, is the secondary circulating-port and is connected to the lower end of the boiler 1 by a pipe 16, which projects downwardly into the boiler, with the end thereof in close proximity to the lower head of the boiler, as shown, whereby the cold water is discharged near the bottom of the boiler to stir up any sediment which may accumulate therein. The hot-water service-pipe 17 preferably is connected to the pipe 14 between the valve 10 and the heater-pipe 5.

The valve-chamber 11 is shown as of a larger diameter at its lower end than at its upper end, and in this chamber works the double piston valve 18, said valve comprising the lower piston 19, which works in the enlarged portion of the valve-chamber, and the upper piston 20, which seats in the smaller portion of the valve-chamber. The valve is provided with the guide-stem 21, projecting into the opening 22 in the cap 23, and the piston 20 is further provided with the guiding arms or projections 24. A spiral spring 25 surrounds the stem 21 and bears with its ends against the cap 23 and the piston 20, said spring serving to hold the piston-valve normally in its lowermost position, as shown in Fig. 2. The lower piston 19 is provided with the safety or leak port 26.

The operation of the valve is as follows: When the faucet in the hot-water service-pipe is closed, the valve will be held by the spring 25 in the position shown in Fig. 2, with the feed-port 12 closed and the circulation-ports 13 and 15 open. In this position the cold water from the lower end of the reservoir 1 will pass up through the pipe 16, through the port 15 into the valve-chamber 11, and from thence through port 13 and pipe 14 into the heating-pipe 5, from which the hot water passes through the pipe 4 into the upper end of the reservoir. Should the faucet in the hot-water pipe 17 leak, the loss of water will be supplied through the safety-opening 26 in the piston 19, and inasmuch as the hot-water pipe 17 is connected to the pipe 14 between the regulating-valve and the heater the only water which passes through the pipe 14 in this position of the valve will be the cold water coming either from the lower end of the reservoir or through the safety-opening 26, and it will be this cold water which will leak out at the faucet in the hot-water service-pipe, so that a wasting of the hot water is impossible. The opening 26 also allows any excess pressure which may be generated in the boiler 1, due to the overheating of the water, to pass back to the main through the feed-port 12, so that said opening 26 serves as a safety device and prevents explosions. As soon as the faucet in the service-pipe is opened to draw hot water the pressure on the two sides of the piston-valve will be unbalanced and the pressure in the feed-pipe will overcome the tension of the spring 25 and the valve will be forced upward against the tension of said spring to the position shown in Fig. 3. In this position the upper valve 20 passes into the smaller portion of the chamber 11, and as this upper piston-valve is not provided with a leak or safety port the passage through the valve to the circulation-port 13 is entirely cut off. The cold water entering the valve through port 12 flows out through the port 15 and pipe 16 into the lower end of the reservoir 1, thereby forcing the hot water in the upper end of the boiler through the pipe 4 and heater-pipe 5 and out through the hot-water service-pipe 17, thereby completely reversing the course of the water through the heater-pipe and carrying out any sediment which may have become deposited therein during the normal condition of the valve. As is well known, the sediment deposits at a high temperature of the water, when the water acts as a precipitant, and this precipitation usually takes place in the heater pipe or coil, so that by reversing the water through the said heater pipe or coil the sediment therein is carried out each time the hot water is drawn, the efficiency of the heater is maintained, and an accumulation of sediment in the heater or reservoir is prevented. Furthermore, by reversing the course of the water the hot water from the upper end of the boiler first passes to the service-pipe 17, so that it is impossible to draw cold water at the hot-water faucet, and this hot water must pass through the heater-pipe 5 on its way to the service-pipe, so that it is reheated and water of a high temperature is insured. The cold water in this position of the valve enters the reservoir through the pipe 16 and is projected thereby down to the bottom of the reservoir, so that the cold water will always lie at the bottom of the reservoir, and as long as there is any hot water in the latter it will be forced out of the boiler through the heater before the cold water can reach the latter. Furthermore, the current of water entering through the pipe 16 will stir up any sediment that may have accumulated in the bottom of the reservoir to be carried up and out through the hot-water pipe 17.

The regulating-valve 10 is so constructed and proportioned that the piston 20 entirely cuts off the circulation-port 13 before the feed-port 12 is opened to the valve-chamber, thus absolutely preventing cold water from flowing from the feed-pipe up through the valve-casing and to the service-pipe when the hot-water faucet is open. The extent of the upward movement of the valve 18 against the tension of the spring 25 will depend upon variations of pressure in the main and also upon the quantity of water per minute which is being drawn from the hot-water faucet, and as a consequence the feed-port 12 is not always exposed to the same extent. It is therefore essential that the circulating-port 13 be entirely cut off before this feed-port is opened at all. Otherwise the flow of water would be broken and the pressures on the two sides of the piston-valve 19 would be momentarily equalized, so that there would be a constant movement of the valve and a constant change from hot to cold water at the hot-water faucet. This is entirely avoided by so constructing and proportioning the valve that the circulating-port is entirely closed before the feed-port is opened. It is evident that the same results would be secured if the piston-valves 19 and 20 were of the same diameter instead of unequal diameters, as shown; but for longevity and to guard against low pressures the lower piston-valve 19, which might be called the "driving-piston," is enlarged to avoid any possible chance of sticking. The upper portion 20 of the valve need be no larger than the area of the size of pipes or fittings used to insure full circulation, and if the lower part 19 of said valve were not enlarged it would not be reliable. It is also evident that instead of using a double-piston valve, such as shown, a single-piston valve can be made to perform all of the functions of the double-piston valve, and I do not desire my invention to be limited to the double-piston valve shown nor to a valve of unequal diameters; neither do I desire my invention limited to the leak or safety port 26 through the lower piston-valve, as the same results could be accomplished by having a by-pass in the valve-casing around said piston-valve 19, said by-pass connecting the feed-port 12 with any other suitable part—as, for instance, with the port 15 or the chamber 11, or even with the circulating-port 13.

What I claim as my invention, and desire to secure by Letters Patent, is—

1. In a water-heater, a reservoir, a heater-pipe, connections between said heater-pipe and reservoir, a valve-casing, a feed-pipe connected thereto, connections between the valve-casing and the reservoir and between the valve-casing and the heater-pipe, a service-pipe connected to the last-named connection, and automatic valve mechanism in said casing adapted to insure a circulation of water downwardly through the reservoir and upwardly through the heater-pipe when the service-pipe is closed, and to reverse the circulation when the service-pipe is opened whereby the previously-heated water passes from the reservoir down through the heater-pipe.

2. In a water-heater, a reservoir, a heater-pipe, connections between said heater-pipe and reservoir, a valve-casing, a feed-pipe connected to the same, said valve-casing being provided with circulation-ports connected respectively to the reservoir and the heater-pipe, a service-pipe connected to the last-named connection, a valve in said casing and controlling the said ports said valve being arranged to maintain a circulation of water downwardly through the reservoir and upwardly through the heater-pipe when the service-pipe is closed and to reverse the circulation when the service-pipe is opened whereby the previously-heated water passes from the reservoir down through the heater-pipe, and a safety or leak port or passage between the valve-chamber and feed-pipe.

3. In a water-heater, a reservoir, a heater-pipe, connections between said reservoir and heater-pipe, a valve-casing, a feed-pipe connected to the same, said valve-casing being provided with circulating-ports connected respectively to the reservoir and to the heater-pipe, a service-pipe connected to the last-named connection, and a piston-valve provided with a leak or safety port in said casing, said piston-valve controlling the ports in the valve-casing and arranged to maintain a circulation of water downwardly through the reservoir and upwardly through the heater-pipe when the service-pipe is closed and to reverse the circulation when the service-pipe is opened, whereby the previously-heated water passes from the reservoir down through the heater-pipe.

4. In a water-heater, a reservoir, a heater-pipe, connections between said reservoir and heater-pipe, a valve-casing, a feed-pipe connected thereto, said valve-casing being provided with circulation-ports connected respectively to the reservoir and to the heater-pipe, a service-pipe connected to the last-named connection, and a valve in said casing, said valve being arranged to close the feed-pipe port and open the circulation-port when the service-pipe is closed and to close the circulating-port before opening the feed-port when the service-pipe is opened, whereby the course of the water through the reservoir and heater is reversed and the flow of cold water to the service-pipe prevented.

5. In a water-heater, a reservoir, a heater-pipe, connections between said reservoir and heater-pipe, a valve-casing, a feed-pipe connected thereto, said valve-casing being provided with circulation-ports connected respectively to the reservoir and to the heater-pipe, a service-pipe connected to the last-named connection, a valve in said casing and controlling the said ports, said valve when the service-pipe is closed closing the feed-pipe and maintaining the circulating-ports open, and when the service-pipe is opened said valve opening the feed-port and closing the circulating-port before opening the feed-port, whereby the course of the water through the reservoir and heater is reversed, and a safety or leak port or passage between the valve-chamber and feed-pipe.

6. In a water-heater, a reservoir, a heater-pipe, connections between said reservoir and heater-pipe, a valve-casing, a feed-pipe connected thereto, said valve-casing being provided with circulation-ports connected respectively to the reservoir and to the heater-pipe, a service-pipe connected to the last-named connection, and a double-piston valve in said casing and controlling the said ports, one of said piston-valves provided with a leak or safety port and arranged to close the feed-water pipe when the service-pipe is closed, and the other of said piston-valves being arranged when the service-pipe is opened to first close the port leading to the heater in advance of the first-named piston opening the feed-water pipe, whereby the current of water to the reservoir and boiler is reversed.

7. In a water-heater, a reservoir, a heater-pipe, connections between said reservoir and heater-pipe, a valve-casing, a feed-pipe connected to the same, a pipe connecting the valve to the reservoir, said pipe projecting into the reservoir close to the bottom thereof, connections between the valve-casing and the heater-pipe, a service-pipe connected to the last-named connection, and automatic valve mechanism in said casing adapted to maintain a circulation of water downwardly through the reservoir and upwardly through the heater-pipe when the service-pipe is closed and to reverse the circulation when the service-pipe is open, whereby the previously-heated water passes from the reservoir down through the heater-pipe.

8. In a water-heater, a reservoir, a heater-pipe, connections between said heater-pipe and reservoir, a valve-casing, a feed-pipe connected thereto, and connections between the valve-casing and the reservoir and between the valve-casing and the heater-pipe, a service-pipe connected to draw the water from the base of the heater without passing through the valve-casing, and automatic valve mechanism in said casing adapted to insure a circulation of water downwardly through the reservoir and upwardly through the heater-pipe when the service-pipe is closed and to reverse the circulation when the service-pipe is open, whereby the previously-heated water passes from the reservoir down through the heater-pipe.

9. In a water-heater, a reservoir, a heater-pipe, connections between said reservoir and heater-pipe, a valve-casing, a feed-pipe connected to the same, said valve-casing being provided with circulating-ports connected respectively to the reservoir and to the heater-pipe, a service-pipe connected to draw the water from the base of the heater without passing through the valve-casing, and a piston-valve provided with a leak or safety port in said casing, said piston-valve controlling the ports in the valve-casing and arranged to maintain a circulation of water downwardly through the reservoir and upwardly through the heater-pipe when the service-pipe is closed and to reverse the circulation when the service-pipe is open, whereby the previously-heated water passes from the reservoir down through the heater-pipe.

10. In a water-heater, a reservoir, a heater-pipe, connections between said reservoir and heater-pipe, a valve-casing, a feed-pipe connected thereto, said valve-casing being provided with circulation-ports connected respectively to the reservoir and to the heater-pipe, a service-pipe connected to draw the water from the base of the heater without passing through the valve-casing, and a valve in said casing, said valve being arranged to close the feed-pipe port and to open the circulating-port when the service-pipe is closed and to close the circulating-port before opening the feed-port when the service-pipe is open, whereby the course of the water through the reservoir and heater-pipe is reversed and the flow of cold water to the service-pipe prevented.

11. A valve for water-heaters and the like, comprising a valve-casing provided with a feed-port and two circulation-ports, and a piston-valve in said casing and controlling said ports, said piston-valve being arranged to close the feed-port when in one position, and when moved to the other position to close one of the circulation-ports in advance of opening the feed-pipe port.

12. A valve for water-heaters and the like, comprising a valve-casing provided with a feed-port and with two circulation-ports, and a double-piston valve in said casing and controlling said ports, one of said pistons being provided with a leak or safety port and arranged to close the feed-port when the valve is in one position, and the other of said pistons being arranged when the valve is moved to the other position to close one of the circulating-ports in advance of the first-named piston opening said feed-port.

13. A valve for water-heaters and the like, comprising a valve-casing having a feed-port and two circulating-ports arranged in different planes, a piston-valve in said casing and controlling the said ports, said piston-valve being exposed on one face to the pressure from the feed-pipe, a spring or the like for normally holding said piston-valve seated to close the feed-port, said piston being arranged to close the feed-port and open the circulation-ports when in one position, and when moved to the other position to close communication between the circulating-ports before opening the feed-port.

In testimony whereof I, the said FREDERICK W. ROBERTSHAW, have hereunto set my hand.

FREDERICK W. ROBERTSHAW.

Witnesses:

ROBERT C. TOTTEN,

F. W. WINTER.